United States Patent
Gauthier et al.

(10) Patent No.: US 12,198,065 B1
(45) Date of Patent: Jan. 14, 2025

(54) SEEDING AND HEALING A GENETIC ALGORITHM TO MITIGATE IRREDUCIBLE COMPLEXITY

(71) Applicant: National Technology & Engineering Solutions of Sandia, LLC, Albuquerque, NM (US)

(72) Inventors: John H. Gauthier, Albuquerque, NM (US); Matthew John Hoffman, Albuquerque, NM (US); Geoffry Scott Pankretz, Albuquerque, NM (US); Adam J. Pierson, Albuquerque, NM (US); Stephen Michael Henry, Albuquerque, NM (US); Darryl J. Melander, Albuquerque, NM (US); Lucas Waddell, Lewisburg, PA (US); John P. Eddy, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 808 days.

(21) Appl. No.: 16/596,866

(22) Filed: Oct. 9, 2019

(51) Int. Cl.
*G06N 5/00* (2023.01)
*G06N 3/126* (2023.01)
*G06N 5/01* (2023.01)

(52) U.S. Cl.
CPC .............. *G06N 5/01* (2023.01); *G06N 3/126* (2013.01)

(58) Field of Classification Search
None
See application file for complete search history.

(56) References Cited

PUBLICATIONS

Hoffman, Matthew John, Gauthier, John H., Pankretz, Geoffry Scott, and Henry, Stephen Michael. Mitigating Irreducible Complexity in Evolutionary Algorithms via Initial Population Seeding . . . United States: N. p., 2014. Web. (Year: 2014).*

* cited by examiner

*Primary Examiner* — Lut Wong
(74) *Attorney, Agent, or Firm* — Daniel J. Jenkins

(57) ABSTRACT

A system and method for designing a physical system using a genetic algorithm includes building a plurality of data structures necessary to build, heal, and verify a plurality of dependency chains; ensuring that multiple dependencies in a respective one of the plurality of dependency chains are represented correctly; removing any dependencies that will be trivially satisfied at random; in response to determining that one or more dependencies is consistent with another dependency, considering one or more combinations of dependencies; and building configurations that satisfy the dependencies and combinations of dependencies by associating the dependencies and combinations of dependencies with selected technology options and recursively specifying and/or revising additional technology options that are consistent with the dependencies or combinations of dependencies, until a configuration is fully specified.

6 Claims, 5 Drawing Sheets

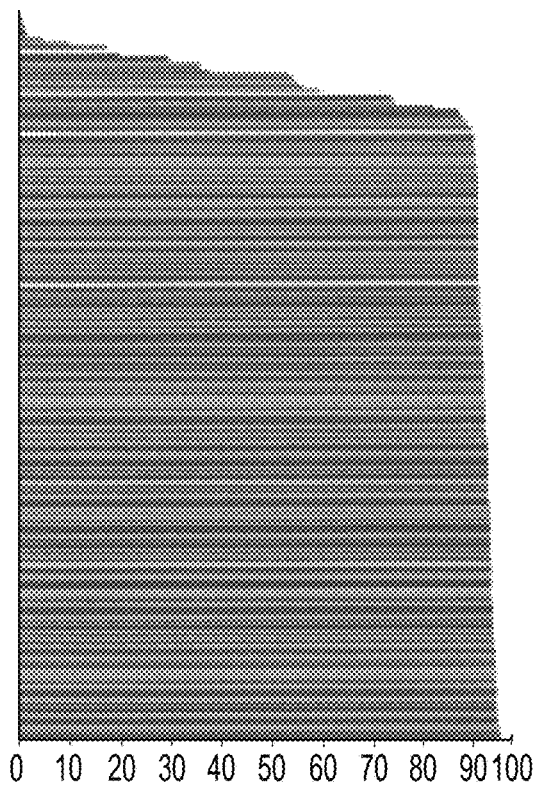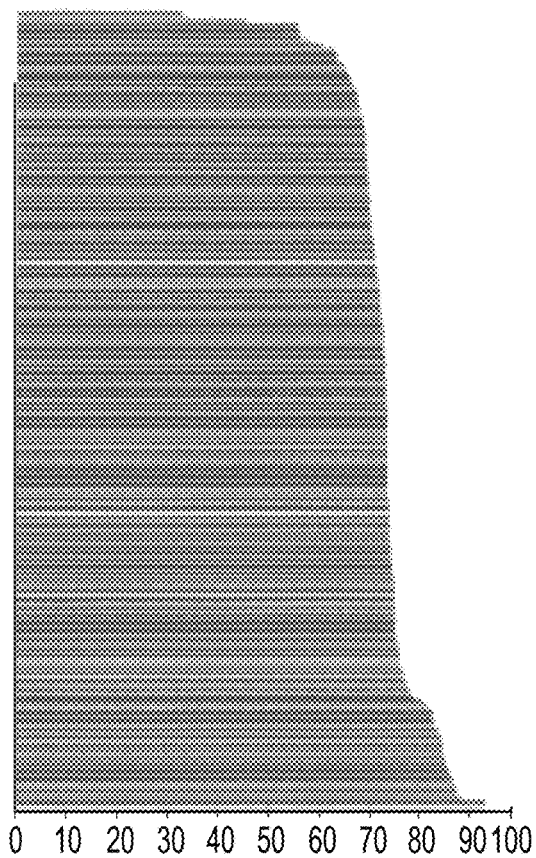
FIG. 5A                                    FIG. 5B

SEEDING AND HEALING A GENETIC ALGORITHM TO MITIGATE IRREDUCIBLE COMPLEXITY

STATEMENT REGARDING FEDERALLY SPONSORED RESEARCH OR DEVELOPMENT

This invention was developed under Contract No. DE-NA0003525 awarded by the United States Department of Energy/National Nuclear Security Administration. The Government has certain rights in this invention.

BACKGROUND OF THE INVENTION

The application generally relates to genetic algorithms for solving multi-objective combinatorial optimization problems. The application relates more specifically to a method and system for seeding a genetic algorithm to mitigate irreducible complexity.

Logical dependency constraints may be included into Genetic Algorithm (GA) approaches for solving multi-objective combinatorial optimization problems. Inclusion of such constraints allows injection of engineering knowledge and prevents resulting solutions from having no practical application in real context. However, it is evident that some combinations of realistic constraints can confound evolutionary operations and can therefore unintentionally exclude many viable, and possibly desirable solutions, from consideration. Such solutions cannot be discovered via evolutionary means, because of irreducible complexity-a situation where an evolutionary algorithm cannot evolve designs by successive discrete steps to investigate certain areas of a solution space. A method and system are disclosed which will mitigate irreducible complexity. The system can be implemented in software or hardware.

Complex system may have many subsystems, each subsystem of which may have multiple viable technology options (for instance, a new vehicle program could consider 8 different engines, 6 different transmissions, etc.). Finding an optimal system configuration presents a complex problem. As the number of subsystems and technology options under consideration increases, the number of potential configurations of such a system grows combinatorially. Search spaces of 1020 candidate configurations are the norm, and spaces as big as 1050 or 10100 are common. Enumeration of such a large set is impossible with the best computational means currently available. A Genetic Algorithm (GA) provides an efficient means of searching this space for solutions that are approximately Pareto optimal, e.g., configurations wherein improved performance cannot be attained at the same cost, or lower cost cannot be attained without sacrificing performance.

Combinatorial optimization involves finding the best set of objects or courses of action to address a problem. For instance, what are the best components to include in a combat vehicle, e.g., what is the best engine, transmission, armor, etc., while still keeping it affordable? Such problems often involve dependencies; in one example, a Diesel engine might require a particular type of transmission that is different than what a hybrid engine might require. Solving combinatorial optimization problems may be difficult, often non-deterministic polynomial-time (NP)-hard, and often requires heuristic techniques such as genetic algorithms. Adding dependencies can make a problem unsolvable by introducing irreducible complexities-features that do not allow an evolutionary solution technique to achieve certain desirable results.

The difficulty arises when dependencies between subsystems or technology options are encountered, particularly as those dependencies become more complex. The more complex a dependency is, the harder it is to satisfy via genetic operations such as mutation and crossover. It is necessary to explore and exploit all relevant areas of a search space, despite this issue.

What is needed is a system and/or method that satisfies one or more of these needs or provides other advantageous features. Other features and advantages will be made apparent from the present specification. The teachings disclosed extend to those embodiments that fall within the scope of the claims, regardless of whether they accomplish one or more of the aforementioned needs.

SUMMARY OF THE INVENTION

One embodiment relates to a method for designing a physical system using a genetic algorithm. The method includes building a plurality of data structures necessary to build, heal, and verify a plurality of dependency chains; ensuring that multiple dependencies in a respective one of the plurality of dependency chains are represented correctly; removing from consideration any dependencies that will be trivially satisfied at random; in response to determining that one or more dependencies is consistent with another dependency, considering one more combinations of dependencies; and building configurations that satisfy the dependencies and combinations of dependencies by associating the dependencies and combinations of dependencies with selected technology options, and recursively specifying and/or revising additional technology options that are consistent with the dependencies or combinations of dependencies, until a configuration is fully specified.

Another embodiment relates to a method for designing a physical system using a genetic algorithm. The method includes building a list of drivers associated with a respective dependency by adding a driver for each respective dependency associated with the driver; determining if one or more child is associated with one of the listed drivers, and adding each child of the driver to an AND logic list; noting at least one technology option associated with a subsystem; determining whether a dependency comprises an obviation; linking a child node for at least one child with a driver node associated with a driver; adding a driver for each dependency to a child drivers list; building a plurality of dependency chains by creating a new chain for each dependency; adding the respective driver of the dependency as a first link; determining whether the dependency comprises a necessitation; in response to determining the necessitation, adding the child to the respective dependency chain; in response to determining that the dependency is an obviation, sampling one or more technology options associated with a subsystem; identifying at least one child that satisfies the obviation; adding the identified child to the dependency chain; determining if the identified child is a driver of another dependency; in response to determining a second dependency, recursively determining whether the dependency is a necessitation and adding children associated with the driver and adding children of children to the chain; in response to reaching a consistent loop, calculating a first probability of a randomly built configuration satisfying a predetermined one of the dependency chains by chance; calculating a second probability of at least two such dependency chains existing in the randomly built initial population of dependency chains; determining if the technology option defines an inconsistent loop; in response to determining that the technology option comprises a consistent loop, building another chain based on a next dependency; determining a Probability Cutoff for each dependency chain; and in response to the second probability of at least two randomly built configurations satisfying the respective dependency chain exceeding a predetermined value, removing the respective dependency chain from the list; growing a list of consistent combinations of dependency chains; initializing the list of dependency chains with the dependency chains wherein each chain by itself is considered a consistent combination; determining for every pairwise combination of combinations in the list first if the combination is viable; in response to determining that the combination is viable, adding the combination to the list; calculating the respective second probability associated with the combination; sorting the list of combinations by increasing first probability of occurrence; building partial configurations by looping over the list of combinations and filling out the respective subsystem specified by each associated combination; if necessary, restarting the loop until a desired number of configurations are built; and building out full configurations.

Yet another embodiment relates to a non-transitory computer-readable medium having stored thereon computer-readable instructions. When executed by a computing device, the computer-readable instructions cause the computing device to build a plurality of data structures necessary to build, heal, and verify a plurality of dependency chains; ensure that multiple dependencies in a respective one of the plurality of dependency chains are represented correctly; remove dependencies that will be trivially satisfied at random; in response to determining that one or more dependencies is consistent with another dependency, consider one more combinations of dependencies; and build configurations that satisfy the dependencies and combinations of dependencies by associating the dependencies and combinations of dependencies with selected technology options.

Still another embodiment relates to a computing device comprising: a processor; and a non-transitory computer-readable medium operably coupled to the processor. The computer-readable medium includes computer-readable instructions stored thereon. When executed by the processor, the computer-readable instructions cause the computing device to build a list of drivers associated with a respective dependency by adding a driver for each respective dependency associated with the driver; determine if one or more child is associated with one of the listed drivers, and add each child of the driver to an AND logic list; note at least one technology option associated with a subsystem; determine whether a dependency comprises an obviation; link a child node for at least one child with a driver node associated with a driver; add a driver for each dependency to a child drivers list; build a plurality of dependency chains by creating a new chain for each dependency; add the respective driver of the dependency as a first link; determine whether the dependency comprises a necessitation; in response to determine the necessitation, add the child to the respective dependency chain; in response to determine that the dependency is an obviation, sample one or more technology options associated with a subsystem; identify at least one child that satisfies the obviation; add the identified child to the dependency chain; determine if the identified child is a driver of another dependency; in response to determine a second dependency, recursively determine whether the dependency is a necessitation and add children associated with the driver and add children of children to the chain; in response to reaching a consistent loop, calculate a first probability of a randomly built configuration satisfying a predetermined one of the dependency chains by chance; calculate a second probability of at least two such dependency chains existing in the randomly built initial population of dependency chains; determine if the technology option defines an inconsistent loop; in response to determine that the technology option comprises a consistent loop, build another chain based on a next dependency; determine a Probability Cutoff for each dependency chain; and in response to the second probability of at least two randomly built configurations satisfy the respective dependency chain exceeding a predetermined value, remove the respective dependency chain from the list; grow a list of consistent combinations of dependency chains; initialize the list of dependency chains with the dependency chains wherein each chain by itself is considered a consistent combination; determine for every pairwise combination of combinations in the list first if the combination is viable; in response to determine that the combination is viable, add the combination to the list; calculate the respective second probability associated with the combination; sort the list of combinations by increasing first probability of occurrence; build partial configurations by looping over the list of combinations and fill out the respective subsystem specified by each associated combination; if necessary, restart the loop until a desired number of configurations are built; and build out full configurations.

Certain advantages of the embodiments described herein are that the disclosed method allows a GA to find adequate solutions to problems with dependencies by healing genetic strands as the solution technique progresses. The healing corrects for the incomplete dependencies that often occur from mating within the GA and that often lead to the discarding of the offspring. Thus, healing allows for survival of offspring with dependencies in the GA. Another advantage of the method is that it provides measures to reduce biasing of the GA population, wherein the end result is the capability to solve combinatorial optimization problems more accurately.

Alternative exemplary embodiments relate to other features and combinations of features as may be generally recited in the claims.

BRIEF DESCRIPTION OF THE DRAWINGS

The application will become more fully understood from the following detailed description, taken in conjunction with the accompanying figures, wherein like reference numerals refer to like elements, in which:

FIG. 5A shows a graphic representation of an average percentage of time a technology option is expressed in a feasible solution out of all the times it is expressed in any solution, across 5 runs, without healing.

FIG. 5B shows a graphic representation of an average percentage of time a technology option is expressed in a feasible solution out of all the times it is expressed in any solution, across 5 runs, with healing.

DETAILED DESCRIPTION OF THE INVENTION

Figure 1A:
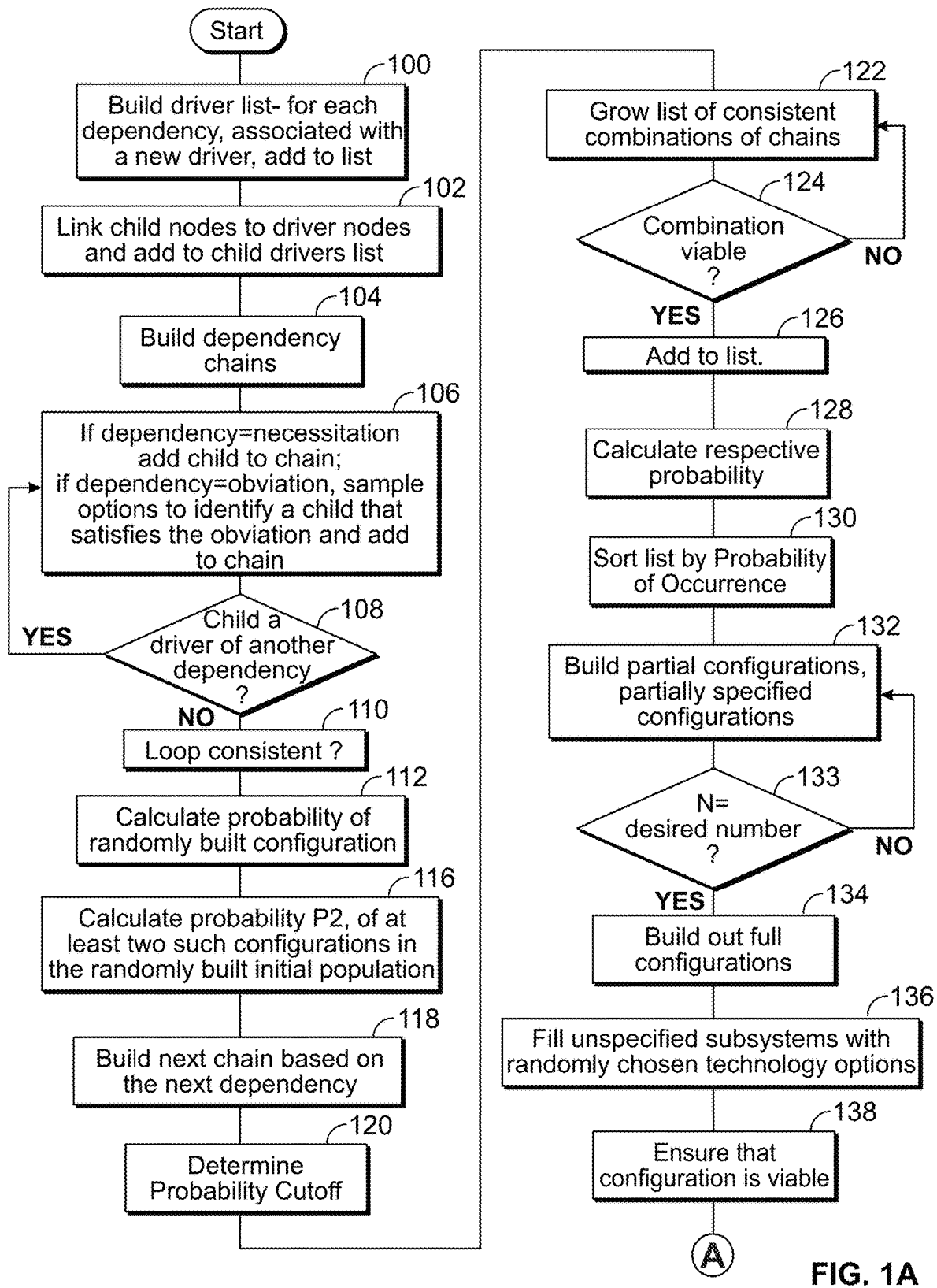
FIG. 1A illustrates a flow diagram of an exemplary method for seeding a genetic algorithm to mitigate irreducible complexity.

Before turning to the figures which illustrate the exemplary embodiments in detail, it should be understood that the application is not limited to the details or methodology set forth in the following description or illustrated in the figures. It should also be understood that the phraseology and terminology employed herein is for the purpose of description only and should not be regarded as limiting.

In order to illustrate the design configuration problem, we first describe an example of a simple dependency configuration that does not exhibit a dependency problem. In this example, an Engine 1 requires Transmission 3; therefore, any configurations that include Engine 1 with a transmission other than Transmission 3 are typically eliminated from the population. In that case, for a mutation to uncover a solution that satisfies this dependency, one of the following must be true: 1) the parent solution must already contain Transmission 3 and then mutate into using Engine 1, OR 2) both subsystems must be mutated at the same time and include, or "land on" Engine 1, Transmission 3. While such a mutation is improbable for a given individual, over the course of thousands of generations, each having thousands of configurations, the desired mutation is virtually guaranteed to occur occasionally. The mutation will most likely occur via the first option above, and once it occurs the trait, or combination, of Engine 1 and Transmission 3, may persist and spread in subsequent generations. Crossover alone usually cannot uncover such a trait, since a configuration including Engine 1 but excluding Transmission 3 would usually be eliminated before it had the chance to crossover with a configuration that includes Transmission 3.

By contrast, a more complex configuration using a vehicle design analogy may be described as follows: starter 2 requires battery 1, which requires alternator 3, which requires engine 1, which requires starter 2 and transmission 3. As in the example above, transmission 3 requires engine 1. The solution that satisfies this dependency is effectively impossible via mutation or crossover, as starter 2 can be put into use within a configuration only if the other four vehicle component options are already selected. The four vehicle component options themselves are only viable if starter 2 is already included in the selected options. Therefore, crossover cannot discover such a solution, as no parent solutions can exist that have only some of the relevant traits. A mutation that selects all five of the vehicle components simultaneously could satisfy the stated dependency, but such a mutation is very unlikely to occur during the execution of the GA. To ensure that the GA adequately considers this trait-starter 2-without fundamentally changing the mutation and/or crossover operations, one may place it in a member of the initial population. If the seeded trait is less effective than other evaluated possibilities, it will die out. Alternately, if beneficial, the seeded trait will have an opportunity to flourish.

A description of an exemplary algorithm for solving a configuration with multiple dependencies by seeding the initial population with complex dependencies is described below. The healing subroutine of this algorithm (depicted in FIG. 1B) can also be used to fix unviable solutions (from mutation and/or crossover operations) throughout the execution of the GA, with representative results shown in FIG. 4 and FIG. 5.

Algorithm Description

Figure 1B:
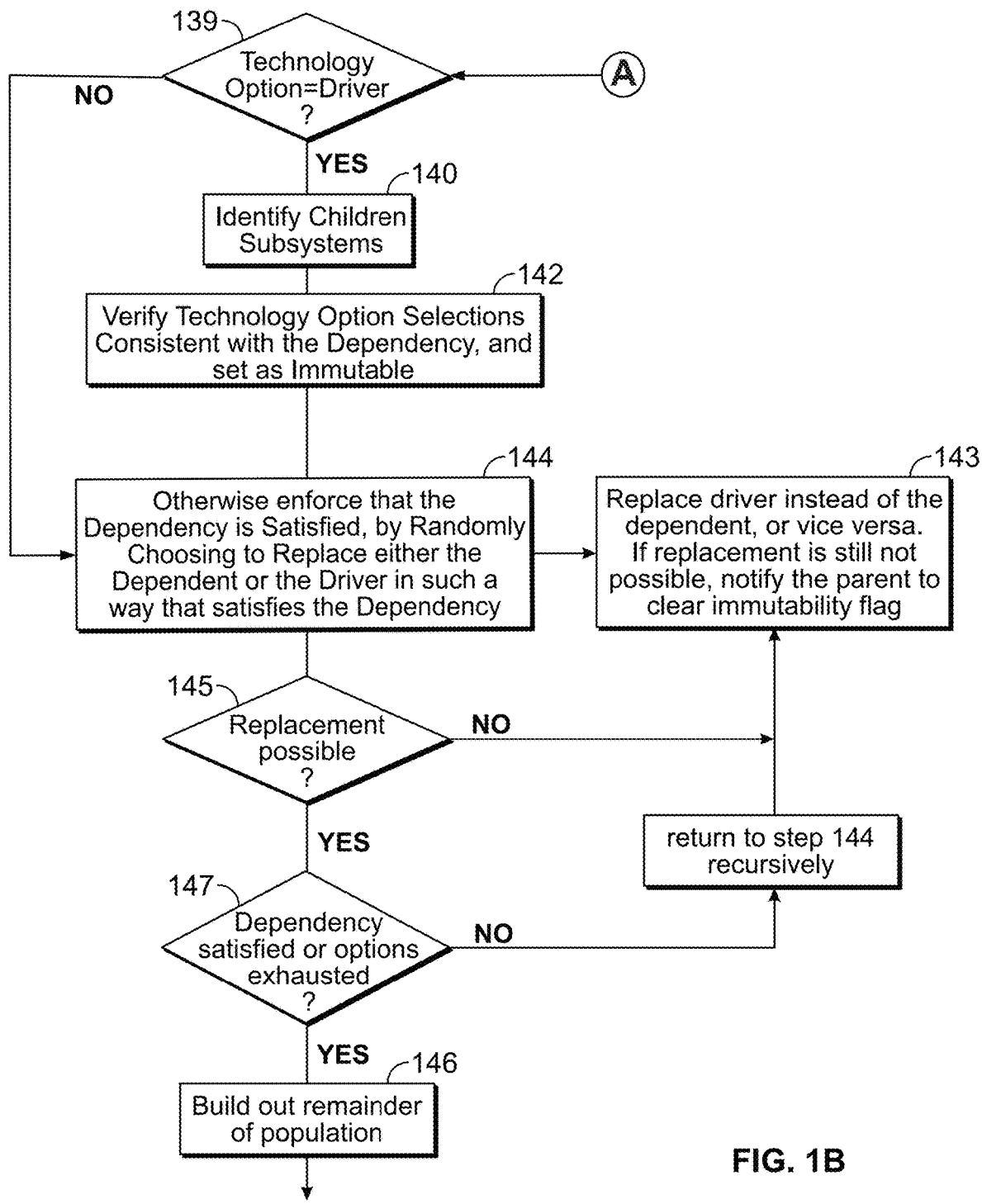
FIG. 1B illustrates the healing subroutine to ensure configurations are viable.

Referring to FIG. 1, an exemplary embodiment of a seeding method to generate the initial population for a Genetic Algorithm (GA) is shown. In the example described herein, obviations are defined as the opposite of necessitations. For example, A1 cannot be combined with B2. A driver is defined as a technology option that requires, or obviates, another technology option, i.e., a driver drives the need for the dependency. The required, or obviated, technology option is referred to as a child in the dependency, since the child will always be hierarchically lower in a dependency chain that starts with a driver.

An algorithm or method for designing a system with complex dependencies is disclosed. Multiple inputs may include subsystems, technology options for subsystems, and dependencies. Additional inputs are defined as: initial size (P) of the population; percentage (d) of the initial population that should be seeded based on dependencies; and a cutoff probability (C). Calculated parameters in the method include the following:

$N=dP$=number of configurations to be built based on dependencies $M=(1-d)P$=number of configurations to be built randomly and then healed so that they do not violate any dependencies.

The method begins at step 100, by building a list of drivers. For each dependency, associated with a new driver, a driver is added to the list of drivers; and add each child of the driver to an AND list, e.g., currentDriver.children, noting the number of options for the subsystem and whether the dependency is an obviation. Next, at step 102, the method links child nodes to driver nodes. For each dependency, a driver is added to currentChild.drivers list.

Next, at step 104, the method proceeds to build dependency chains. At step 106, the method creates a new chain for each dependency, and adds the respective driver of the dependency as the first link. At step 106, if the dependency is a necessitation, the child is then added to the chain; if the dependency is an obviation, the method samples subsystem options to identify a child that satisfies the obviation and adds the identified child to the chain. Next, at step 108, the method determines if the child identified in step 106 is also a driver of another dependency, and if so, returns to step 106 and repeats the process in (b) recursively by adding children associated with the driver, the children's children, etc., to the chain.

At step 110, upon reaching a consistent loop, e.g., (A1->B1->C1->A1) or a leaf node, e.g., (A1->B1->C2 where C2 is not a driver for further dependencies), the method proceeds to step 112 to calculate the probability, P1, of a randomly built configuration satisfying this chain by chance; P1 is calculated by—for each subsystem involved-calculating (1/number of options) for necessitations or (1-1/number of options) for obviations, and then take the product of all these terms to get the overall probability. Next, at step 116, the method calculates the probability, P2, of having at least two such configurations in the randomly built initial population, using the binomial distribution with individual probability P1 and initial population size M, and determines if the option defines an inconsistent loop (e.g., A1->B1->C1->A2) such that the chain is unviable, and the option is removed. Otherwise, the method proceeds at step 118 and builds the next chain based on the next dependency.

Next, at step 120, a Probability Cutoff is determined for each dependency chain, and if the probability P2 of having at least two randomly built configurations satisfy this dependency is greater than a cutoff value C, e.g. 95%, the chain is removed from the list, as the removed chain will almost certainly be represented anyway just by chance. Next, at step 122, the method proceeds to grow a list of consistent combinations of chains. Initialize the list with the chains left over from step 120 wherein each chain by itself is considered a consistent combination.

Then, for every pairwise combination of combinations in the list, at step 124, first determine if the combination is viable, i.e., no inconsistent overlapping technology option selections. For instance, combining A1-B2-C3 with D1-E1 or even D1-B2 is viable, but combining A1-B2-C3 with D2-B1 is not because they select different options for subsystem B. This step should be performed without backtracking, i.e., once combinations i-j, i-k, i-l, i-m, etc., have all been evaluated, start evaluating j-k, j-l, j-m, but do not evaluate j-i because it is identical to i-j which has already been evaluated.

Next, at step 126, if the combination is viable, the combination is added to the end of the list. This makes the combination available for further combination with later combinations. For instance, if i-j is consistent and is added as combination z, combinations k-z, l-z, m-z, etc., will be evaluated. Then, at step 128, calculate the respective probability associated with the combination as in step 116 above.

At step 130, the method proceeds to sort the list of combinations by increasing probability of occurrence P1. At step 132, the method proceeds to build partial configurations, or configurations that are only partially specified, by looping over the list of combinations and filling out the subsystems as specified by each combination. This step continues, restarting the loop if necessary, until the desired number N configurations have been built, at step 133. Next at step 134, the method proceeds to build out full configurations as follow: for each partial configuration, at step 136, fill unspecified subsystems with randomly chosen technology options.

Next, at step 138, ensure that configuration is viable. For each subsystem, in random order, determine if the selected technology option is a driver of a dependency at step 139. If so, proceed to step 140 and identify children subsystems and at step 142, verify if the tech option selections are consistent with the dependency, and set the relevant technology options as immutable (for this configuration) so future repairs will not break the verified dependency; otherwise at step 144, enforce that the dependency is satisfied by randomly choosing to replace either the dependent or the driver in such a way that satisfies the dependency. At step 145, if this replacement is not possible, repeat by replacing the driver instead of the dependent, or vice versa at step 143. If replacement is still not possible at step 143, notify the parent that it must clear its immutability flag and at step 147 return to step 144 recursively up the chain until at step 146 the dependency chain is satisfied, or all options are exhausted. It is noted that that the method steps as described above represents just one possible algorithm for seeding and healing of a GA, and other algorithms may be within the scope of the invention, as limited only by the appended claims. While it is theoretically possible for this algorithm to result in an infinite loop, unhealable chain sets are relatively rare. In an alternate embodiment, loop counters or other structures and method may be introduced to guarantee against non-termination.

Next, at step 146 build out remainder of the initial population with random configurations, using healing technique beginning with step 138.

By way of further explanation, Steps 100-102 build the data structures necessary to build, heal, and verify dependency chains. Step 104 ensures that multi-level dependencies (e.g., A requires B and B requires C) are represented correctly. Step 120 removes from consideration any dependencies that will be trivially satisfied at random. Step 122 allows consideration of combinations of dependencies, if consistent with each other.

Step 132 is the first step in building configurations that satisfy the dependencies (and combinations thereof) by "translating" them into technology option selections. Step 130 ensures that the ones with the least chance "in the wild" get the best representation.

Step 134 specifies the rest of the configuration at random and ensures that it does not violate any other dependencies.

Step 146 ensures that the rest of the initial population is also viable. Otherwise, it is possible that the only viable solutions in later generations will be descendants of the configurations from the preceding steps of the method 100. It should be noted that both steps 138 and 146 overlap in performing the viability check.

It should be noted that while this method has been designed for initial population seeding, much of the method can also be repurposed for other applications within genetic algorithms. In particular, a variation of this method may be used to inject viable "immigrants" into the GA population in later generations, to improve genetic diversity and mitigate the possibility of beneficial traits dying off due to "bad luck", e.g., being combined with bad traits and getting removed from the population. Furthermore, the healing subroutine can be used on any unviable solution at any time during the execution of the GA, adding still more opportunity to improve genetic diversity and discover beneficial solutions that would otherwise suffer from irreducible complexity.

Figure 2:
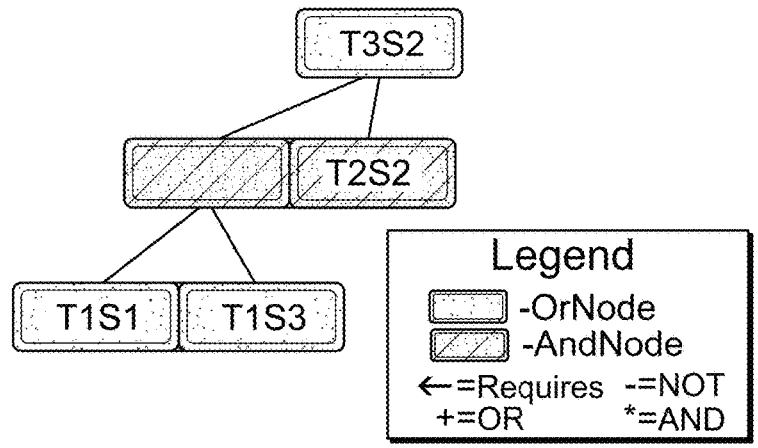
FIG. 2 shows an exemplary embodiment of a tree structure for implementing a healing algorithm.
Figure 3:
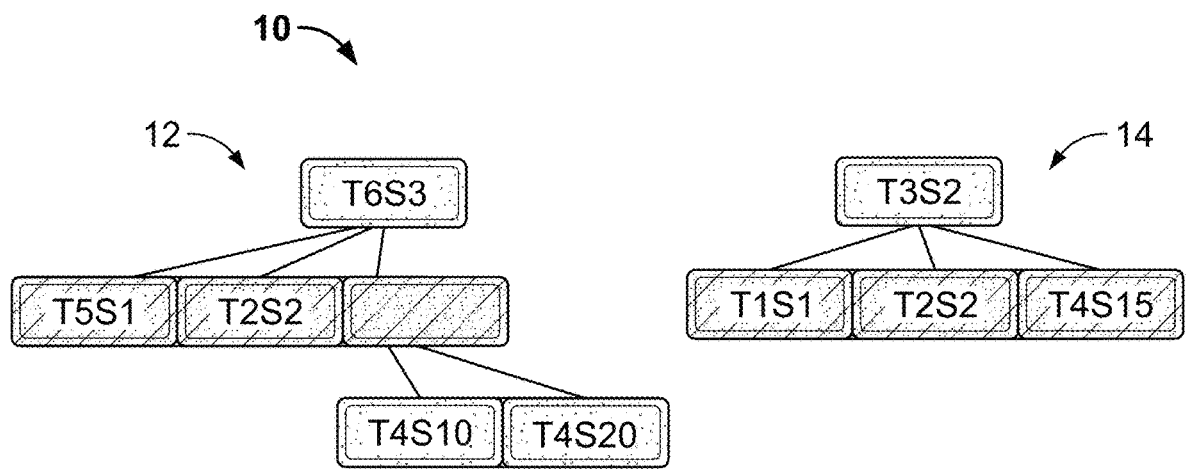
FIG. 3 shows an exemplary embodiment having two related tree structures for implementing a healing algorithm, which are consistent with FIG. 2 but occur later in the algorithm.

Referring to FIGS. 2 & 3, an embodiment of the method of the present invention is disclosed as follows:

Before the GA optimization commences, the algorithm builds up a series of dependency tree structures representing all possible dependencies within the system. Arranging the dependencies into a tree structure allows the healing algorithm to recursively move up and down the tree structure to rapidly discover any potential option which will fulfill the dependency requirements. These tree structures have two types of nodes: AND nodes and OR nodes. OR nodes are created from obviations and explicit OR conditions. AND nodes represent direct necessitation dependencies within the system. For example, in the example of FIG. 2, techoption T1 has three sub-options defined as T1S1, T1S2, T1S3. Therefore, the obviation leaves the remaining two options T1S1 and T1S2 as possible selections creating an OR condition. On the other hand, techoption T2 only has two suboptions, T2S1 and T2S2, so that the obviation creates an AND condition, T2S2. These dependency trees are merged with other driver trees as applicable to create robust trees which represent the interlinked dependencies.

The healing algorithm iterates through a randomized order of the subsystems and determines if the selected option is a driver of a dependency. If the option drives a dependency, it is determined whether that dependency is met. When dependencies are met, they are flagged and not changed by the algorithm, however, if the dependency is unmet, one of two things occur: 1) Either the driver of the dependency is replaced or 2) the dependency is healed. Replacement or healing is randomly determined, and if the selected action fails, the other action is attempted. This random selection is done to prevent biasing the solution set.

Referring next to FIG. 3, an exemplary system 10 with two dependency trees 12, 14 is shown. If a configuration consisted of T1S1, T2S1, T3S2, T4S10, T5S4 and T6S3, neither dependency chain 12, 14 is valid. The healing algorithm may randomly order the techoptions and iterate through the chain healing invalid dependencies. If in FIG. 3 the chosen order is T5, T2, T6, T1, T3, T4, the algorithm would begin by looking at the option selected for T5. In this case, neither T5 nor the next techoption, T2, drive a dependency and the algorithm would continue onto T6. Since T6S3 drives a dependency, the algorithm randomly chooses to either replace the option or heal it. If the option were valid, it would flag all the techoptions involved in the dependency as immutable (T6, T5, T2, T4 in this case). In this instance, the suboption selected for T5 and T2 both violate the dependency. For this example, the algorithm chooses to heal and recursively traverses the tree. As each node is visited, if the incorrect suboption is selected and the techoption is not flagged as immutable, the algorithm will replace the invalid suboption with the correct one. Since T4S10 is already valid for the OR option, it will flag the immutable and return at that point.

After healing the T6S3 option, the new configuration would be T1S1, T2S2, T3S2, T4S10, T5S4 and T6S3. Techoptions T2, T4, T5 and T6 would be flagged immutable. Healing would then continue through the techoption list until it hit T3 which drives the next dependency. If the algorithm tried to heal the configuration, it would quickly determine it impossible to heal due to the required T4 option (S15) and T4 being flagged immutable. The healing would then replace the T3S2 with another randomly selected valid option. The end result would be T1S1, T2S2, T3S3, T4S10, T5S4 and T6S3, which is a valid configuration according to the dependencies.

In addition to healing the initial "seed" solutions, the healing method can be used after each generation of mutation and crossover of the GA; all solutions that violate any dependency are copied, healed and injected back into the GA for assessment with the rest of the solutions. In order to minimize the possible bias from adding genetic material to the population, no solutions that are generated through the standard GA methodology are removed. Over many generations the healing will inject numerous configurations of valid strands to the GA for consideration allowing for more in-depth exploration of valid solution space.

Figure 4A:
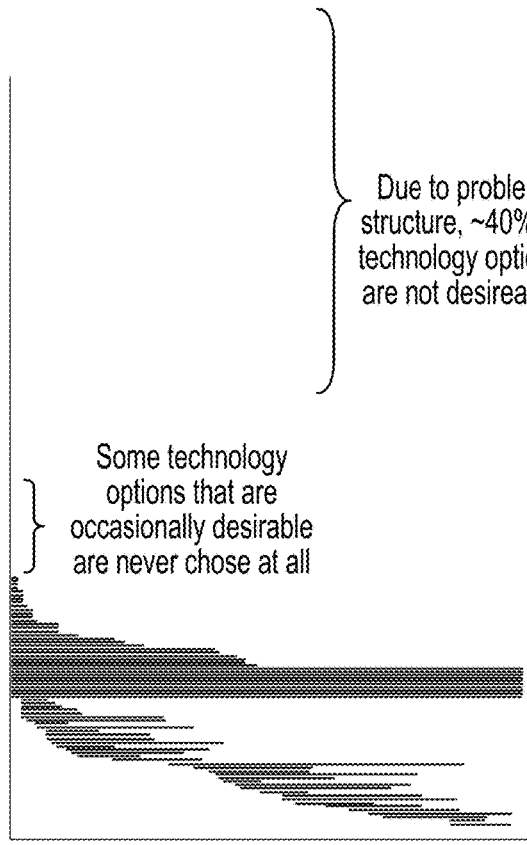
FIG. 4A shows a graphical representation of a Genetic Algorithm result when performed without healing.
Figure 4B:
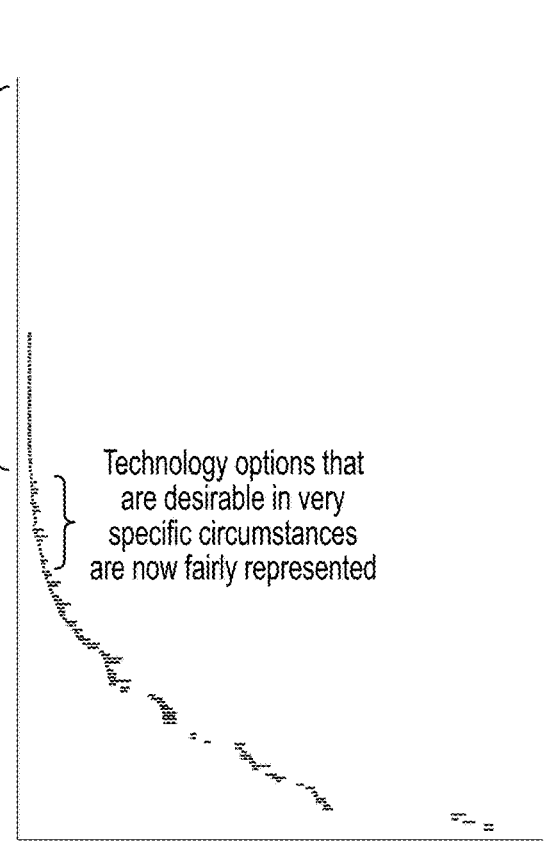
FIG. 4B shows a graphical representation of a Genetic Algorithm result when performed with healing.

Referring to FIGS. 4A and 4B, difficulties with dependencies between subsystems may be discovered during testing, as shown by the respective technology options. Healing may be implemented for technology management optimization for GA-based multi-objective optimization. The test model which originally exhibited severe problems with dependencies was rerun with a healing algorithm and again without the healing algorithm, and five exemplary models run with different random seeds. Run-to-run variability of technology option prevalence in the final population is shown. For each technology option, the band shows the range between its smallest prevalence value and largest prevalence value across all 5 runs.

As shown in FIGS. 4A & 4B, the disclosed healing method provides a dramatic positive difference in run-to-run consistency and in the likelihood that certain technology options are considered or given a "fair chance". In FIG. 4A, along a vertical axis as shown, some desirable technology options are occasionally desirable are not chosen at all, and due to problem structure, approximately forty percent (40%) of technology options are undesirable. In FIG. 4A, most technology options that are chosen have massive run-to-run variability-up to 100%; i.e. in 0% of the population in one run, and 100% in another. By contrast, as shown in FIG. 4B, as demonstrated along the vertical axis, technology options that are desirable in very specific circumstances are fairly represented. Run-to-run variability does not exceed ~5%, e.g. chosen in 40% of the population in one run and 45% in another run.

Referring next to FIGS. 5A and 5B, a graphic representation of the GA algorithm with healing and without healing shows that an average percentage of time a technology option is expressed in a feasible solution out of all the times it is expressed in any solution, across 5 runs. In FIG. 5A, without healing 17 technology options are never expressed in a feasible solution, in any of the 5 test runs. Many more are expressed feasibly only very rarely, and possibly 0 times in at least some of the test runs. In FIG. 5B, with healing, only four technology options are structurally infeasible while all other technology options are expressed in a feasible solution at least 30% of the time.

While the exemplary embodiments illustrated in the figures and described herein are presently preferred, it should be understood that these embodiments are offered by way of example only. Accordingly, the present application is not limited to a particular embodiment but extends to various modifications that nevertheless fall within the scope of the appended claims. The order or sequence of any processes or method steps may be varied or re-sequenced according to alternative embodiments.

The present application contemplates methods, systems and program products on any non-transitory computer-readable media for accomplishing its operations. The embodiments of the present using seeding and healing method may be implemented, e.g., on an FPGA or a custom chip having suitable I/O and storage, on existing computer processors, or by a special purpose computer processor for an appropriate system, incorporated for this or another purpose or by a hardwired system.

It is important to note that the construction and arrangement of the seeding and healing of genetic algorithm or methods to mitigate irreducible complexity, as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

As noted above, embodiments within the scope of the present application include program products comprising non-transitory computer-readable media for carrying or having machine-executable instructions or data structures stored thereon. Such non-transitory computer-readable media can be any available media which can be accessed by a general purpose or special purpose computer or other machine with a processor. By way of example, such non-transitory computer-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a non-transitory computer-readable medium. Thus, any such connection is properly termed a non-transitory computer-readable medium. Combinations of the above are also included within the scope of non-transitory computer-readable media. Machine-executable instructions comprise, for example, instructions and data which cause a general purpose computer, special purpose computer, or special purpose processing machines to perform a certain function or group of functions.

It should be noted that although the figures herein may show a specific order of method steps, it is understood that the order of these steps may differ from what is depicted. Also, two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

The invention claimed is:

1. A method for designing a physical system using a genetic algorithm, comprising:
    building a plurality of data structures necessary to build, heal, and verify a plurality of dependency chains, wherein the structures are created by translating each dependency into a list of ANDs and ORs, changing the NOTs into ORs, and placing the OR lists into each dependency chain of the plurality of dependency chains to generate a new list, then subsuming into each dependency chain of the plurality of dependency chains that include the list by traversing the list to replace each chain with the new list, ANDing to the new list by adding viable combinations of independent members that contain no other dependency chains in the new list;
    ensuring that multiple dependencies in a respective one of the plurality of dependency chains are represented correctly by removing subsumed list members and non-viable list members, wherein subsumed and non-viable list members are members that share members;
    removing any dependencies that are satisfied below a predetermined level at random, by calculating the probability of list members randomly occurring in a randomly produced initial population given non-seeded population size;
    in response to determining that one or more dependencies is consistent with another dependency, considering one more combinations of dependencies, by recursively adding to the list by ANDing the viable combinations of independent members;
    building configurations that satisfy the dependencies and combinations of dependencies by associating the dependencies and combinations of dependencies with selected technology options; and
    configurations that are built that violate any dependencies are copied, healed and injected back into the configurations that satisfy the dependencies and combinations of dependencies for assessment with all configurations, whereby healing comprises randomly selecting items including the same decision variables initial items, substituting the items in the configuration and testing the configuration for viability, and repeating the selecting and substituting of applicable items until a viable configuration is achieved or until a termination condition is reached and the configuration is removed from the solution space; and
    wherein building configurations include specifying other dependencies in the configuration at random.

2. The method of claim 1, wherein one of the plurality of dependencies comprises a configuration in which a first technology option requires or obviates a second technology option and the second technology option requires or obviates a third technology option.

3. The method of claim 1, further comprising ensuring that the dependencies and combinations of dependencies with a least chance receive representation.

4. The method of claim 1, further comprising ensuring that the randomly specified configuration does not violate any dependencies.

5. The method of claim 1, further comprising ensuring that the rest of the technology options of the initial population is viable by building another set of data structures comprising a series of dependency tree structures representing all possible dependencies within the system, such that each item in the decision space that has a dependency or dependencies is the root of a tree and the dependent items flow from the root beginning ANDed dependencies on the first level, followed by ORed dependencies.

6. The method of claim 5, wherein in response to ensuring viability of the technology options, the only viable solutions in later generations comprise descendants of the configurations from the plurality of data structures.

* * * * *